United States Patent
Lo

(10) Patent No.: US 8,736,783 B2
(45) Date of Patent: May 27, 2014

(54) LIQUID CRYSTAL DISPLAY AND SUPPORTING DEVICE THEREOF

(75) Inventor: Ching-I Lo, Miao-Li County (TW)

(73) Assignees: Innocom Technology (Shenzhen) Co., Ltd., Shenzhen (CN); Chimei Innolux Corporation, Miao-Li County (TW)

( * ) Notice: Subject to any disclaimer, the term of this patent is extended or adjusted under 35 U.S.C. 154(b) by 81 days.

(21) Appl. No.: 13/469,726

(22) Filed: May 11, 2012

(65) Prior Publication Data

US 2012/0314155 A1 Dec. 13, 2012

(30) Foreign Application Priority Data

Jun. 10, 2011 (TW) .............................. 100120455 A

(51) Int. Cl.
*G02F 1/1333* (2006.01)

(52) U.S. Cl.
USPC ............................................................ 349/58

(58) Field of Classification Search
USPC .......................................................... 349/58
See application file for complete search history.

(56) References Cited

U.S. PATENT DOCUMENTS 8,284,343 B2 * 10/2012 Koike et al. ..................... 349/58

* cited by examiner

*Primary Examiner* — James Dudek
(74) *Attorney, Agent, or Firm* — McClure, Qualey & Rodack, LLP

(57) ABSTRACT

A supporting device including a first supporting element, a second supporting element and a third supporting element is provided. The first supporting element includes a first wedging member. The second supporting element being disposed adjacent to the first supporting element includes a second wedging member. The third supporting element includes a first opening corresponding to the first wedging member or the second wedging member. The second supporting element and the third supporting element are wedged with the first supporting element by the first wedging member.

6 Claims, 6 Drawing Sheets

LIQUID CRYSTAL DISPLAY AND SUPPORTING DEVICE THEREOF

This application claims the benefit of Taiwan application Serial No. 100120455, filed Jun. 10, 2011, the subject matter of which is incorporated herein by reference.

BACKGROUND OF THE INVENTION

1. Field of the Invention

The invention relates in general to a supporting device of an LCD, and more particularly to a supporting device having superior structural strength and making the LCD thinner and slimmer.

2. Description of the Related Art

Along with the development and advance in consumer electronic products and communication products, liquid crystal display (LCD) has been widely used in liquid crystal TV, notebook computer, desktop computer, smart phone, and so on. As the design of electronic products is directed towards slimness, lightweight and compactness, LCD is also directed towards the same trend, and thinning LCD has become a mainstream product in the market. Therefore, how to provide an even thinner LCD has become a prominent task for the industries.

The LCD can be thinner through the reduction in the thickness of the components of the LCD. In general, the LCD includes an LCD panel and a backlight module.

When assembling the glass substrate and the backlight module of an LCD, a bracket is used to support and fix the glass substrate and the backlight module. The structural design of bracket affects the overall thickness of LCD after the assembly is completed. Therefore, how to improve the structural design of the bracket such that the bracket after assembly still has sufficient structural strength and the structure of the bracket is made thinner has become one of the methods for thinning an LCD.

SUMMARY OF THE INVENTION

The invention is directed to a supporting device of an LCD. The supporting device with sufficient structural strength makes the overall thickness of an assembled LCD reduced and is thus conducive to the thinning of LCD.

According to a first aspect of the present invention, a supporting device including a first supporting element, a second supporting element and a third supporting element is provided. The first supporting element includes a first wedging member. The second supporting element being disposed adjacent to the first supporting element includes a second wedging member. The third supporting element includes a first opening corresponding to the first wedging member or the second wedging member. The second supporting element and the third supporting element are wedged with the first supporting element by the first wedging member.

According to a second aspect of the present invention, a liquid crystal display (LCD) module including a backlight module, a liquid crystal panel and a supporting device is provided. The supporting device supports the backlight module and the liquid crystal panel. The supporting device includes a first supporting element, a second supporting element and a third supporting element. The first supporting element includes a first wedging member. The second supporting element being disposed adjacent to the first supporting element includes a second wedging member. The third supporting element includes a first opening corresponding to the first wedging member or the second wedging member. The second supporting element and the third supporting element are wedged with the first supporting element by the first wedging member.

The above and other aspects of the invention will become better understood with regard to the following detailed description of the preferred but non-limiting embodiment(s). The following description is made with reference to the accompanying drawings.

DETAILED DESCRIPTION OF THE INVENTION

During the assembly of a liquid crystal display (LCD) module, more than one bracket is used for supporting and fixing a substrate and a backlight module. In order to fix the supporting brackets together, the fixing portion of the bracket is designed as a lump or a hole, such that the lump and the hole can be wedged with each other. For three brackets to be wedged together, the middle bracket needs to have two holes, and each of the two outer brackets has a lump for wedging with one of the two holes of the middle bracket respectively. Since the lumps of the two outer brackets are fixed in the two holes of the middle bracket, the force applied on the middle bracket is large. Normally, the supporting device used for supporting the LCD module is thicker and more complicated in order to provide the assembled supporting device with sufficient structural strength to bear the force applied on the supporting device. Consequently, the assembled LCD module is also thicker and more complicated. To resolve the aforementioned problem, the invention provides a supporting device having at least three supporting elements. For the three supporting elements to be wedged together, the middle bracket can be wedged with two outer supporting elements with only one wedging member.

Figure 1:
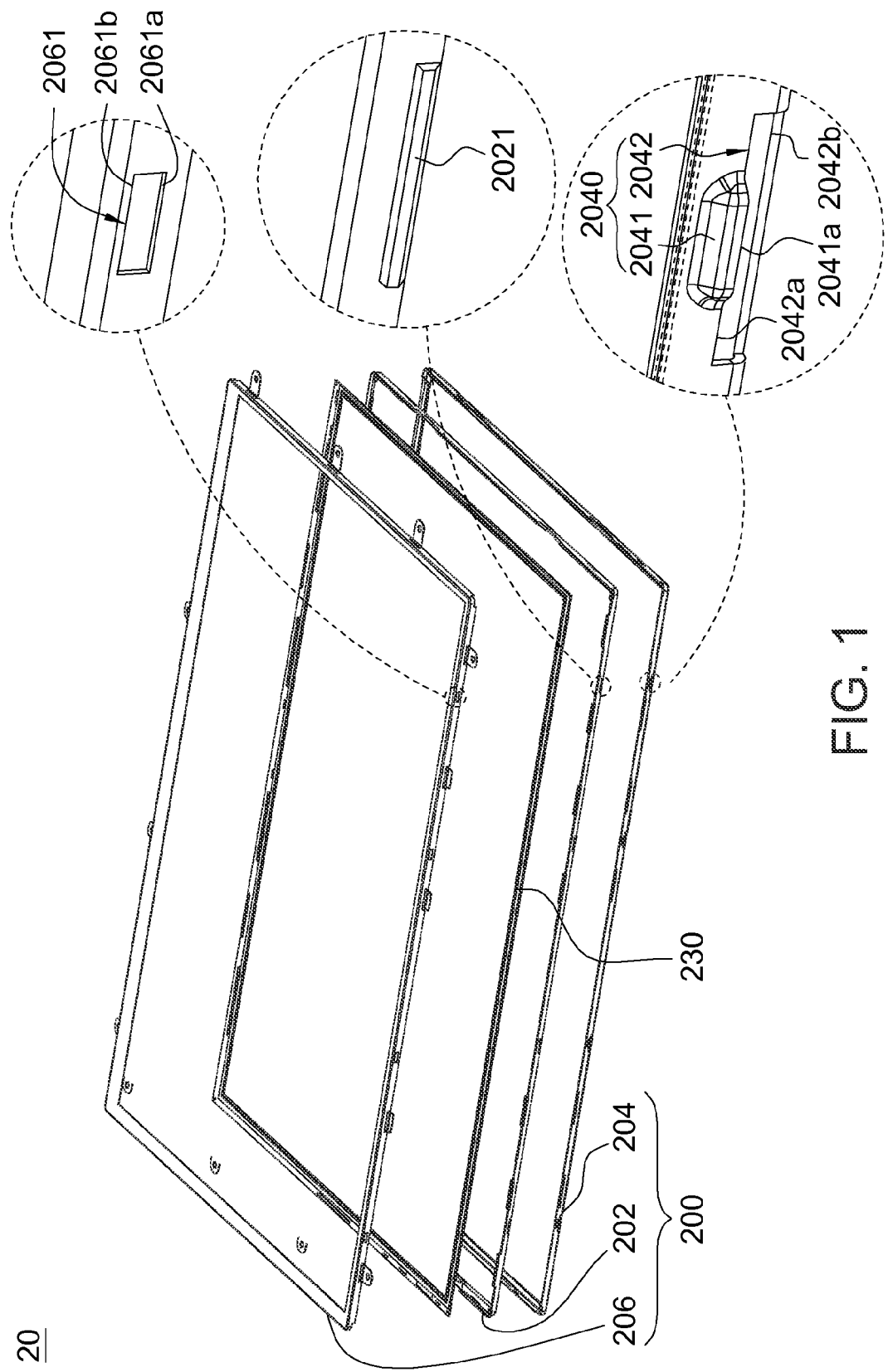
FIG. 1 shows an explosion diagram of an LCD module according to a first embodiment of the invention.

Referring to FIG. 1, an explosion diagram of an LCD module 20 according to a first embodiment of the invention is shown. As indicated in FIG. 1, the LCD module 20 has a supporting device 200 and a liquid crystal panel 230. The supporting device 200 includes a supporting element 202, a supporting element 204 and a supporting element 206. The supporting element 202 has a lump 2021. The supporting element 204 has a wedging member 2040 including a protrusion 2041 and an opening 2042, wherein the protrusion 2041 and the opening 2042 can be integrally formed in one piece. The protrusion 2041 has a lateral surface 2041a. The opening 2042 has a sidewall 2042a and a sidewall 2042b opposite to the sidewall 2042a. The lateral surface 2041a is substantially coplanar with the sidewall 2042a of the opening 2042, and is protruded outwardly for a suitable distance. The supporting element 206 has an opening 2061 having a sidewall 2061a and a sidewall 2061b opposite to the sidewall 2061a.

Figure 2:
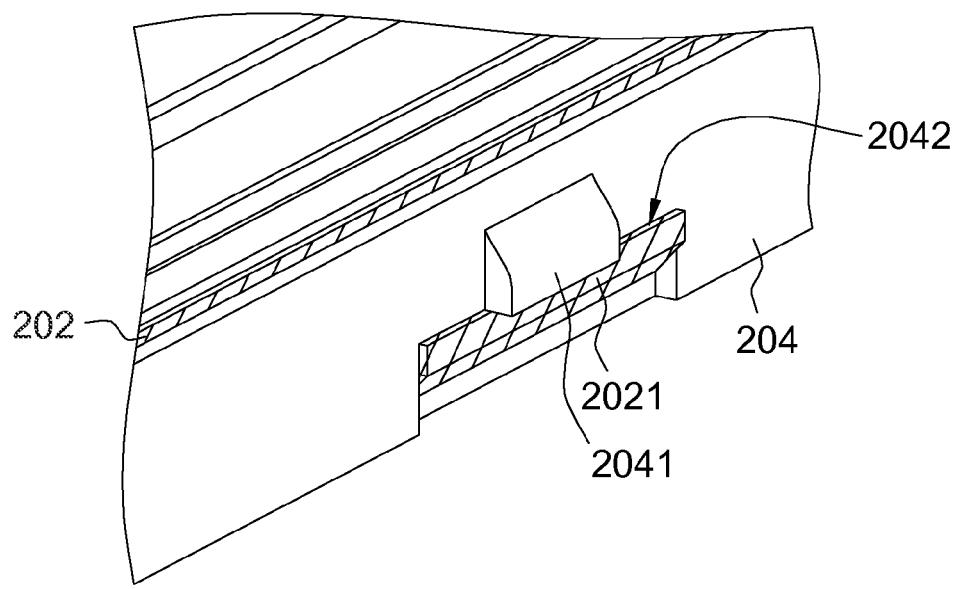
FIG. 2 shows a wedging structure of a first supporting element and a second supporting element according to a first embodiment of the invention.
Figure 3:
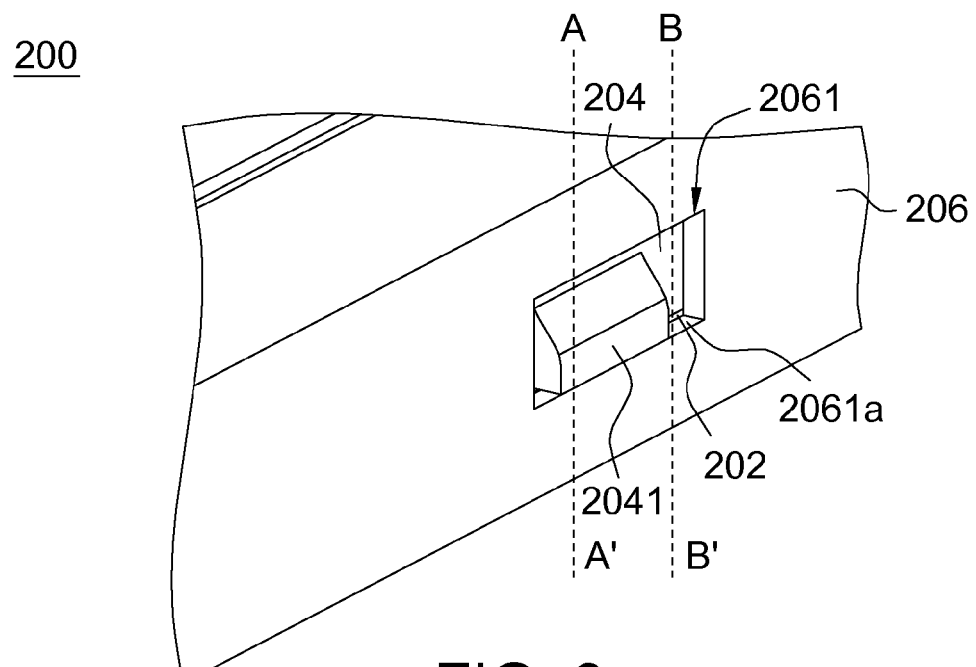
FIG. 3 shows a wedging structure of a second supporting element and a third supporting element according to a first embodiment of the invention.

Referring to FIG. 2 and FIG. 3. FIG. 2 shows a wedging structure of a supporting element 202 and a supporting element 204 of the supporting device 200 according to a first embodiment of the invention. As indicated in FIG. 2, the opening 2042 of the supporting element 204 corresponds to the lump 2021 of the supporting element 202 for wedging with the lump 2021. Since the supporting element 202 is covered by the supporting element 204, only the lump 2021 and a portion of the lateral surface of the supporting element 202 are exposed.

FIG. 3 shows a wedging structure of a supporting element 204 and a supporting element 206 of the supporting device 200 according to a first embodiment of the invention. As indicated in FIG. 3, the opening 2061 of the supporting element 206 corresponds to the protrusion 2041 of the supporting element 204 for wedging with the protrusion 2041. Since the supporting elements 202 and 204 are covered by the supporting element 206, only a portion of the lateral surface of the supporting element 202 as well as the protrusion 2041 and a portion of the lateral surface of the supporting elements 204 are exposed.

Figure 4:
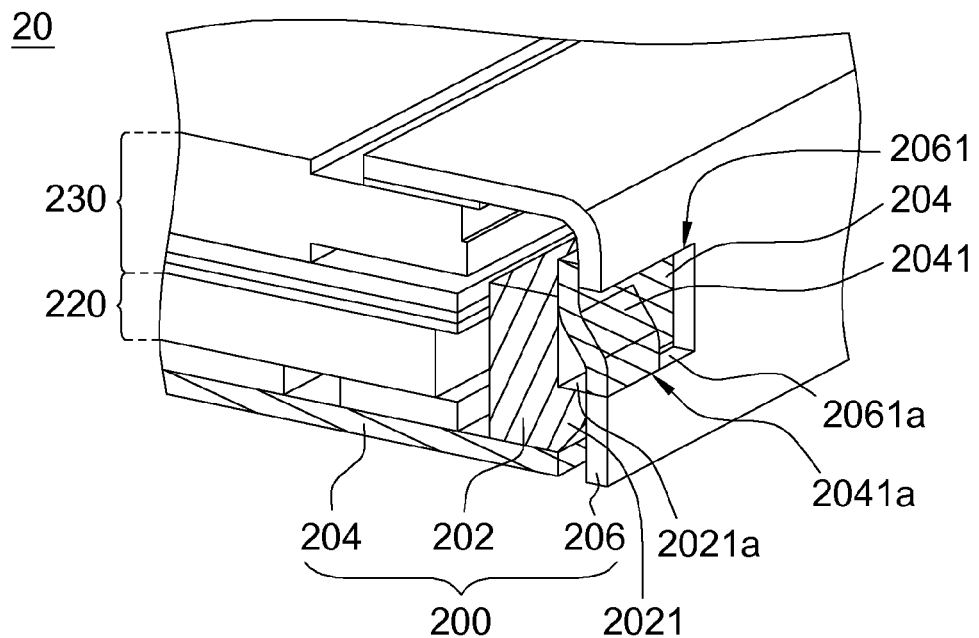
FIG. 4 shows a cross-sectional view along the A-A' direction of a wedging structure according to a first embodiment of the invention.
Figure 5:
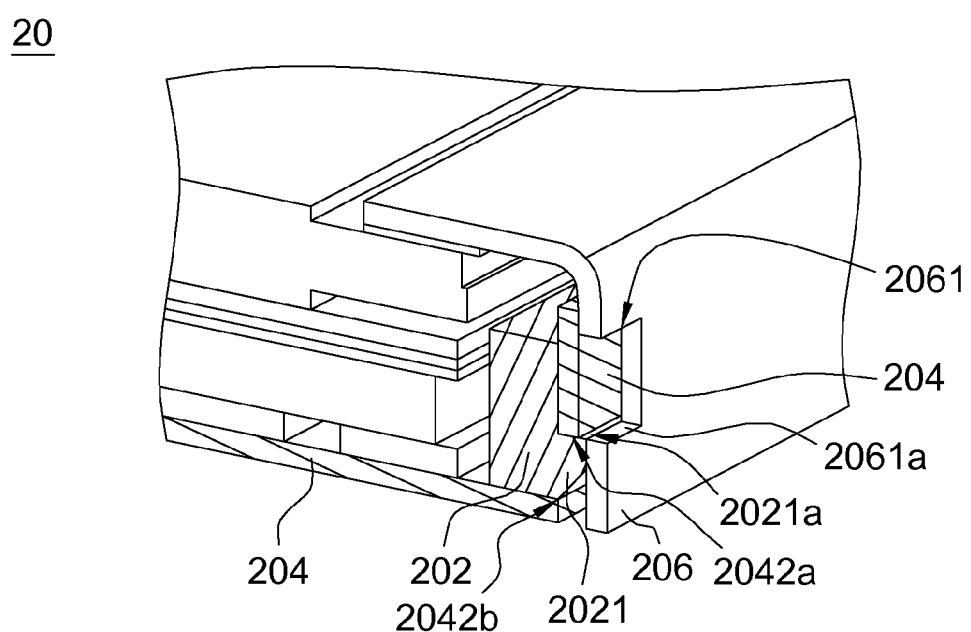
FIG. 5 shows a cross-sectional view along the B-B' direction of a wedging structure according to a first embodiment of the invention.

Referring to FIG. 4 and FIG. 5. FIG. 4 shows a cross-sectional view along the A-A' direction of a wedging structure of the supporting device 200 of FIG. 3. As indicated in FIG. 4, the LCD module 20 includes a supporting device 200, a backlight module 220 and a liquid crystal panel 230. The opening 2061 of the supporting element 206 has a sidewall 2061a. When the protrusion 2041 of the supporting element 204 is wedged with the opening 2061, the lateral surface 2041a of the protrusion 2041 contacts the sidewall 2061a of the opening 2061 by a surface, such that the movement of the supporting element 204 along the direction perpendicular to the sidewall 2061a is restricted.

In the present embodiment, the protrusion 2041 being streamline-shaped is protruded from the supporting element 204 without contacting the sidewall 2061b (illustrated in FIG. 1). The protrusion 2041 can also be in the shape of a square, a rectangle, a trapezoid or a plate, and any shape would do as long as such shape allows the lateral surface 2041a of the protrusion 2041 to contact the sidewall 2061a of the opening 2061 when the protrusion 2041 of the supporting element 204 is wedged with the opening 2061 of the supporting element 206. In addition, as long as the position of the protrusion 2041 allows the protrusion 2041 corresponding to the opening 2061 and allows the protrusion 2041 be able to be wedged with the opening 2061, the position of the protrusion 2041 does not necessarily correspond to the center of the opening 2061.

FIG. 5 shows a cross-sectional view along the B-B' direction of a wedging structure of the supporting device 200 of FIG. 3. As indicated in FIG. 5, when the lump 2021 of the supporting element 202 is wedged with the opening 2042 (illustrated in FIG. 1) of the supporting element 204, the lateral surface 2021a of the lump 2021 contacts the sidewall 2042a of the opening 2042, such that the movement of the supporting element 202 along the direction perpendicular to the sidewall 2042a is restricted.

In the present embodiment, the lump 2021 being trapezoid-shaped is protruded from the supporting element 202. The lump 2021 can also be in the shape of a square, a rectangle, a streamline or a plate, and any shape would do as long as such shape allows the lateral surface 2021a of the lump 2021 to contact the sidewall 2042a of the opening 2042 when the lump 2021 of the supporting element 202 is wedged with the opening 2042 of the supporting element 204.

In the present embodiment, the supporting elements 202, 204 and 206 can be formed by a plastic material or a metal material, and no specific restriction is applied. The plastic material is such as polycarbonate (PC), and the metal material is such as aluminum, galvanized steel plate or stainless steel.

Figure 6:
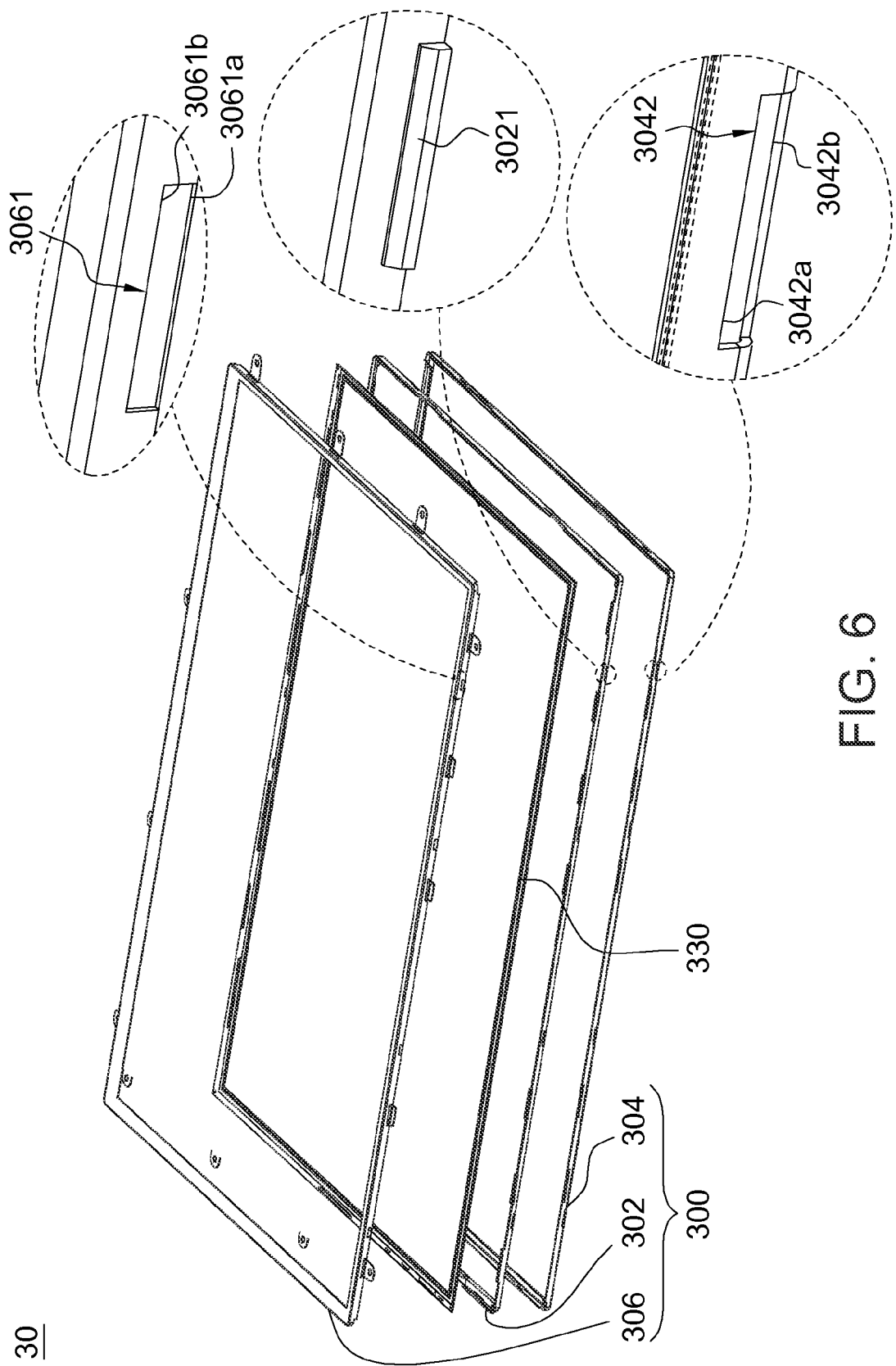
FIG. 6 shows an explosion diagram of an LCD module according to a second embodiment of the invention.

Referring to FIG. 6, an explosion diagram of an LCD module 30 according to a second embodiment of the invention is shown. As indicated in FIG. 6, LCD module 30 has a supporting device 300 and a liquid crystal panel 330. The supporting device 300 includes a supporting element 302, a supporting element 304 and a supporting element 306. The supporting element 302 has a lump 3021. The supporting element 304 has an opening 3042 having a sidewall 3042a and a sidewall 3042b opposite to the sidewall 3042a. The supporting element 306 has an opening 3061 having a sidewall 3061a and a sidewall 3061b opposite to the sidewall 3061a.

Figure 7:
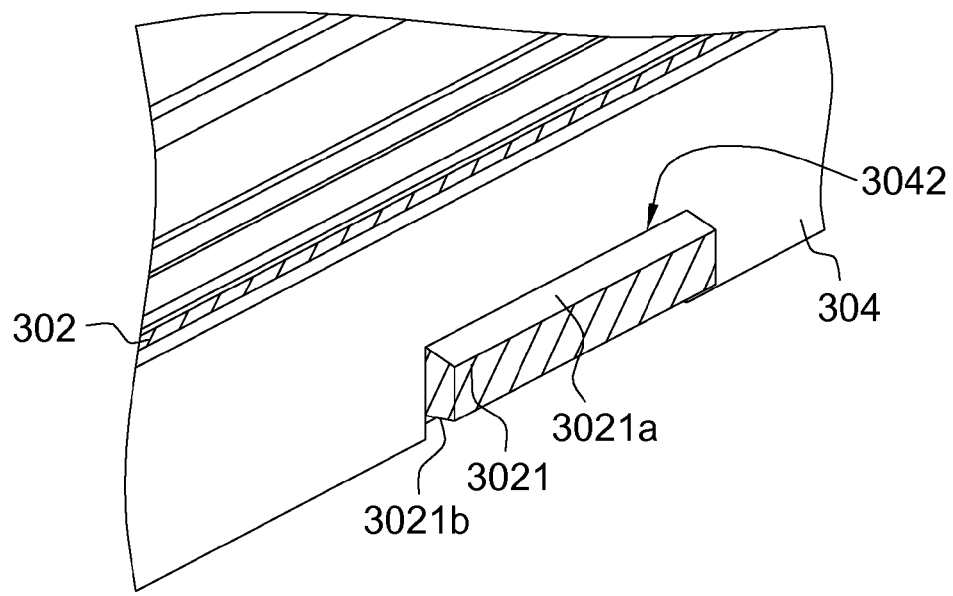
FIG. 7 shows a wedging structure of a first supporting element and a second supporting element according to a second embodiment of the invention.

Referring to FIG. 7, a wedging structure of a supporting element 302 and a supporting element 304 according to a second embodiment of the invention is shown. As indicated in FIG. 7, the wedging arrangements of the supporting elements 302 and 304 are similar to that of the supporting elements 202 and 204 of the first embodiment, and the similarities are not repeated here. In the present embodiment, after the lump 3021 of the supporting element 302 is wedged with the opening 3042 of the supporting element 304, the lump 3021 is still protruded from the outer lateral surface of the supporting element 304. Also, the surface of the supporting element 304 does not need to have any lumps or protrusions disposed thereon. As indicated in FIG. 7, since the supporting element 302 is covered by the supporting element 304, only the lump 3021 and a portion of the lateral surface of the supporting element 302 are exposed.

Figure 8:
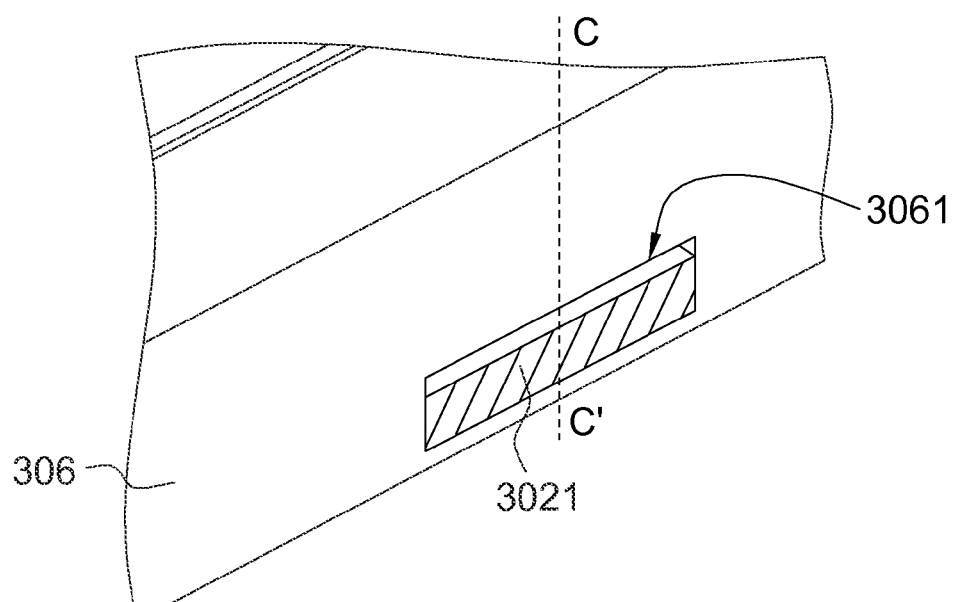
FIG. 8 shows a wedging structure of a second supporting element and a third supporting element according to a second embodiment of the invention.

Referring to FIG. 8, a wedging structure of a supporting element 302, a supporting element 304 and a supporting element 306 according to a second embodiment of the invention is shown. Since the supporting element 302 and the supporting element 304 are covered by the supporting element 306, only the lump 3021 of the supporting element 302 is exposed.

Figure 9:
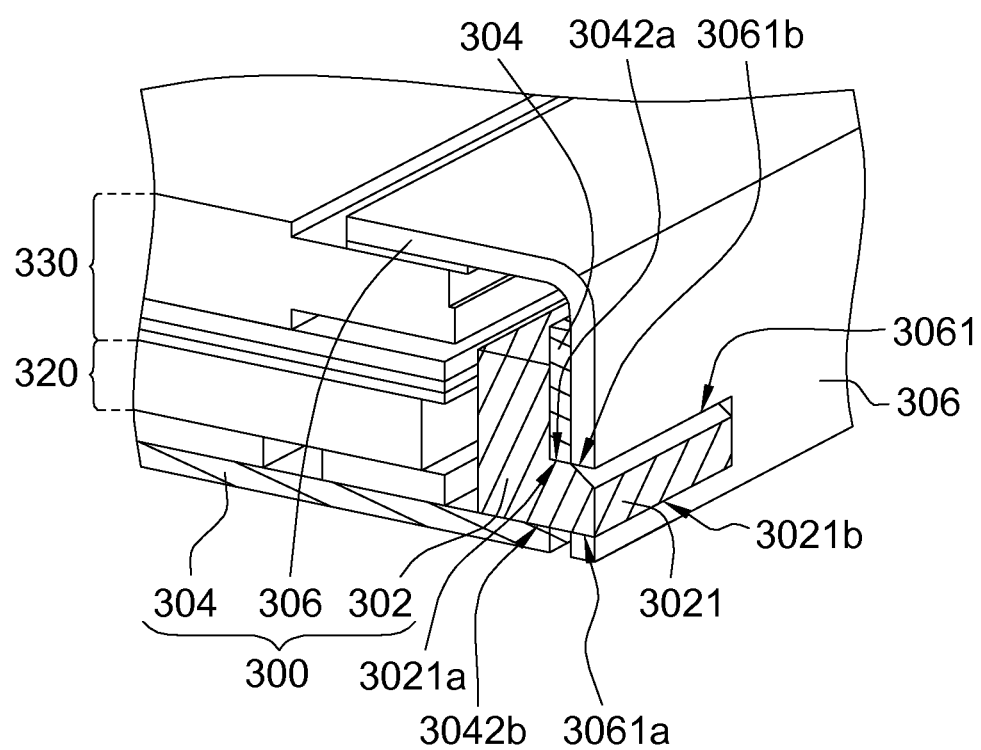
FIG. 9 shows a cross-sectional view along the C-C' direction of a wedging structure according to a second embodiment of the invention.

Referring to FIG. 9, a cross-sectional view along the C-C' direction of the wedging structure of FIG. 8 is shown. As indicated in FIG. 9, the lump 3021 of the supporting element 302 is wedged with the opening 3042 (illustrated in FIG. 6) of the supporting element 304. The opening 3061 of the supporting element 306 is disposed adjacent to the opening 3042 and corresponds to the lump 3021 for wedging with the lump 3021. The opening 3042 has a sidewall 3042a. The opening 3061 has a sidewall 3061a. The lump 3021 has a lateral surface 3021a and a lateral surface 3021b opposite to the lateral surface 3021a. The lateral surface 3021a contacts the sidewall 3042a, and the lateral surface 3021b contacts the sidewall 3061a by a surface substantially coplanar with the sidewall 3042b, such that the movement of the supporting element 302 along the direction perpendicular to the sidewall 3042a, and the movement of the supporting element 304 along the direction perpendicular to the sidewall 3042a or the sidewall 3061a are both restricted.

As indicated in FIG. 9, the lateral surface 3021a of the lump 3021 is inclined downwardly at the position corresponding to the sidewall 3061b of the opening 3061. That is, the lateral surface 3021a does not need to contact the sidewall 3061b. In the present embodiment, the lump 3021 being polygonal-shaped is protruded from the supporting element 302. The lump 3021 can also be in the shape of a square, a rectangle, a streamline or a plate, as long as such shape allows the lateral surface 3021a to contact the sidewall 3042a of the opening 3042 when the lump 3021 of the supporting element 302 is wedged with the opening 3042 of the supporting element 304, and allows the lateral surface 3021b to contact the sidewall 3061a of the opening 3061 when the lump 3021 of the supporting element 302 is wedged with the opening 3061 of the supporting element 306, wherein the lump 3021 has a lateral surface 3021a and a lateral surface 3021b opposite to the lateral surface 3021a.

In the present embodiment, the supporting elements 302, 304 and 306 can be formed by a plastic material or a metal material, and no specific restriction is applied. The plastic material is such as polycarbonate (PC), and the metal material is such as aluminum, galvanized steel plate or stainless steel.

According to the supporting device disclosed in above embodiments of the invention, since the wedging part of each supporting element requires only one hole, superior structural strength is thus achieved. Moreover, the mold complexity is reduced with the reduction in the number of holes of the supporting element. Also, due to the special design in the relative position between the hole and its corresponding lump or protrusion, the supporting device of the invention has superior structural strength and the overall thickness of the liquid crystal panel is reduced.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A supporting device, comprising:
    a first supporting element comprising a first wedging member;
    a second supporting element disposed adjacent to the first supporting element, wherein the second supporting element comprises a second wedging member; and
    a third supporting element comprising a first opening corresponding to the first wedging member, wherein the second supporting element and the third supporting element are wedged with the first supporting element by the first wedging member;
    wherein the first wedging member comprises a second opening and a protrusion, the second opening corresponds to the second wedging member for being wedged with the second wedging member, the first opening corresponds to the protrusion for being wedged with the protrusion.

2. The supporting device according to claim 1, wherein the second wedging member is a lump having a first lateral surface, the second opening has a first sidewall contacting the first lateral surface for restricting the second supporting element to move in a direction perpendicular to the first sidewall.

3. The supporting device according to claim 2, wherein the protrusion has a second lateral surface, and the first opening of the third supporting element has a second sidewall contacting the second lateral surface for restricting the first supporting element to move in a direction perpendicular to the second sidewall.

4. A liquid crystal display (LCD) module, comprising:
    a backlight module;
    a liquid crystal panel;
    a supporting device for supporting the backlight module and the liquid crystal panel, wherein the supporting device comprises:
    a first supporting element comprising a first wedging member;
    a second supporting element disposed adjacent to the first supporting element, wherein the second supporting element comprises a second wedging member;
    a third supporting element comprising a first opening corresponding to the first wedging member, wherein the second supporting element and the third supporting element are wedged with the first supporting element by the first wedging member;
    wherein the first wedging member comprises a second opening and a protrusion, the second opening corresponds to the second wedging member for being wedged with the second wedging member, the first opening corresponds to the protrusion for being wedged with the protrusion.

5. The LCD module according to claim 4, wherein the second wedging member is a lump having a first lateral surface, the second opening has a first sidewall contacting the first lateral surface for restricting the second supporting element to move in a direction perpendicular to the first sidewall.

6. The LCD module according to claim 5, wherein the protrusion has a second lateral surface, the first opening of the third supporting element has a second sidewall contacting the second lateral surface for restricting the first supporting element to move in a direction perpendicular to the second sidewall.

* * * * *